No. 745,802.

Patented December 1, 1903.

UNITED STATES PATENT OFFICE.

LAZAR EDELEANU AND GRIGORE A. FILITI, OF BUKHAREST, RUMANIA.

NITRO PRODUCT.

SPECIFICATION forming part of Letters Patent No. 745,802, dated December 1, 1903.

Application filed June 10, 1902. Serial No. 111,039. (No specimens.)

*To all whom it may concern:*

Be it known that we, LAZAR EDELEANU and GRIGORE A. FILITI, subjects of the King of Rumania, and residents of Bukharest, Rumania, have invented Nitro Products, of which the following is a specification.

The object of our invention is to obtain useful nitro products from petroleum or mineral oil distillates of a specific gravity of at least 0.870. Experiments have shown that strong nitric acid cannot be employed for direct nitration of such distillates, because the resultant reaction is too violent and yields no utilizable products, while diluted nitric acid yields products which affect the character of the products of nitration injuriously. On the other hand, nitration may be effected by treatment with a mixture of concentrated sulfuric acid and nitric acid or of anhydrous sulfuric acid and nitric acid. This fact is all the more surprising as it was to be assumed that nitrosulfuric acid, as is otherwise generally the case, would act even more violently than concentrated nitric acid alone.

In carrying out our invention the hydrocarbons should be combined with the acid mixture at a relatively low temperature, care being taken that the temperature of reaction shall not exceed 80° centigrade. The hydrocarbons can be introduced into the acid mixture as long as the product of reaction continues to have a brown color. The appearance of black would indicate a consumption of the acting nitric acid and the setting in of injurious reactions of the sulfuric acid.

The acid mixture may be introduced into the hydrocarbon distillates. In that case the result of the reaction will give a black appearance at first; but introduction of the acid mixture must be continued until the reaction mixture has again been turned to brown.

The quantity of the acid mixture, as well as its composition, may vary according to the nature of the petroleum distillates employed and is to be determined beforehand by test. For example, however, it may be said that the employment of three parts of acid mixture to one part of petroleum distillate has given satisfactory results. Thus we have successfully employed three hundred kilograms of acid mixture to one hundred kilograms of petroleum distillate of the specific gravity of 0.890. In general the acid mixture may contain five parts of sulfuric acid to one part of nitric acid.

On the completion of the nitration the product of reaction is separated, as by the addition of water, the product sinking to the bottom, while the undecomposed hydrocarbons rise to the surface of the water and can be skimmed off. The nitro product thus obtained can be cleaned by treatment with water.

As the heavy fractions obtained by distillation of petroleum are apt to contain products of decomposition which in the presence of sulfuric acid yield resinous products, and so would pollute the nitro products to be obtained, it is useful to subject the distillates to a preliminary purifying treatment before their nitration. For this purpose we subject the petroleum distillates in the first instance to the action of small quantities of sulfuric acid in order to thereby separate the products of decomposition. For this a treatment with about one per cent. of sulfuric acid is sufficient.

By following out the process hereinbefore described the yield in nitro products will vary from thirty to ninety per cent. These products are semisolid to solid reddish-brown substances of especially elastic properties. They are fairly soluble in alcohol, very soluble in acetone, and they dissolve generally in the well-known organic solvents. They dissolve also in strong potash lye, in which case black-brown color solutions result.

The nitro products obtained by our process find many practical applications. Thus they may serve as additions to resins or as additions to varnish by dissolving in solvents. They are suitable for the production of celluloid-like substances when they are worked up with guncotton. When mixed with oxidizing media, such as nitrate of potassium, nitrate of ammonium, and the like, they form very powerful explosives. By fusing these nitro products with alkaline sulfids, polysulfids, caustic potash and sulfur, &c., we obtain brown to black coloring substances, the color tone of which will vary with the proportion and temperature employed. These colors dye cotton without employing mordants.

We claim as our invention—

As a new article of manufacture, the herein-described nitro product obtained from heavy petroleum distillates, and consisting of semi-solid or solid reddish-brown substances, having elastic properties, and soluble in alcohol, very soluble in acetone and soluble generally in organic solvents, and producing explosives when mixed with oxidizing media, dissolving in strong potash lye with the result of a black-brown-color solution, producing brown or black coloring-matters when fused with alkaline sulfids, producing celluloid-like substances when worked up with guncotton and producing varnishes when mixed with solvents, all substantially as described.

In testimony whereof we have signed our names to this specification in the presence of two subscribing witnesses.

LAZAR EDELEANU.
GRIGORE A. FILITI.

Witnesses:
C. B. SHARP,
D. A. BUDESTEANER.